United States Patent

McCune

(10) Patent No.: US 9,222,416 B2
(45) Date of Patent: Dec. 29, 2015

(54) TURBINE ENGINE GEARBOX

(71) Applicant: UNITED TECHNOLOGIES CORPORATION, Hartford, CT (US)

(72) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/470,982

(22) Filed: Aug. 28, 2014

(65) Prior Publication Data

US 2014/0366548 A1    Dec. 18, 2014

Related U.S. Application Data

(63) Continuation of application No. 14/174,878, filed on Feb. 7, 2014, which is a continuation-in-part of application No. 13/438,245, filed on Apr. 3, 2012, now Pat. No. 8,720,306.

(60) Provisional application No. 61/592,964, filed on Jan. 31, 2012.

(51) Int. Cl.
  *F16H 1/28* (2006.01)
  *F02C 7/36* (2006.01)
  (Continued)

(52) U.S. Cl.
  CPC . *F02C 7/36* (2013.01); *F01D 15/12* (2013.01); *F02K 3/072* (2013.01); *F16H 1/28* (2013.01);
  (Continued)

(58) Field of Classification Search
  CPC ......... F16H 1/28; F16H 1/46; F16H 57/0006; F16H 37/06; F02C 7/36; F02C 3/14; F05D 2260/40311; F02K 3/072; F02K 3/04

USPC ............... 74/665 B, 665 GB, 396, 468, 640; 60/226.1, 226.3, 39.163, 39.162, 793, 60/774, 792, 268
See application file for complete search history.

(56) References Cited

U.S. PATENT DOCUMENTS 2,067,477 A    1/1937   Cooper
2,684,591 A    7/1954   Lundquist
(Continued)

FOREIGN PATENT DOCUMENTS

EP    0896922 B1    1/2004
EP    1876338       1/2008
(Continued)

OTHER PUBLICATIONS

European Search Report for EP Application No. 07253078.5, Dec. 5, 2007.

(Continued)

*Primary Examiner* — Ha D Ho
*Assistant Examiner* — Jude Agendia
(74) *Attorney, Agent, or Firm* — Carlson, Gaskey & Olds, PC

(57) ABSTRACT

A gas turbine engine comprises a fan, a compressor, a combustor, and a fan drive turbine rotor. The fan drive turbine drives the fan through a gear reduction. The gear reduction includes at least two double helical gears in meshed engagement. Each of the at least two double helical gears are disposed to rotate about respective axes, and each have a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth. A method is also disclosed.

19 Claims, 5 Drawing Sheets

(51) Int. Cl.
*F16H 1/46* (2006.01)
*F01D 15/12* (2006.01)
*F02K 3/072* (2006.01)
*F16H 57/00* (2012.01)

(52) U.S. Cl.
CPC .............. *F16H 1/46* (2013.01); *F16H 57/0006* (2013.01); *F05D 2260/40311* (2013.01); *Y02T 50/671* (2013.01)

(56) References Cited

U.S. PATENT DOCUMENTS

| | | | |
|---|---|---|---|
| 2,734,396 | A | 2/1956 | Falk et al. |
| 3,160,026 | A | 12/1964 | Rosen |
| 3,352,178 | A | 11/1967 | Lindgren et al. |
| 4,583,413 | A | 4/1986 | Lack |
| 4,641,543 | A | 2/1987 | Jessup |
| 5,211,541 | A | 5/1993 | Fledderjohn et al. |
| 5,415,595 | A * | 5/1995 | Nelson .................. F16H 35/008 475/221 |
| 5,433,674 | A | 7/1995 | Sheridan et al. |
| 5,466,198 | A | 11/1995 | McKibbin et al. |
| 5,472,383 | A * | 12/1995 | McKibbin ........... F16H 57/0482 184/6.12 |
| 5,528,960 | A | 6/1996 | Nagao et al. |
| 5,815,922 | A | 10/1998 | Sato |
| 6,122,985 | A * | 9/2000 | Altamura ............... B64D 35/00 74/392 |
| 6,223,616 | B1 | 5/2001 | Sheridan |
| 6,264,138 | B1 | 7/2001 | Hawkins |
| 6,302,356 | B1 | 10/2001 | Hawkins |
| 6,402,654 | B1 * | 6/2002 | Lanzon ................ B60K 17/344 475/204 |
| 6,622,473 | B2 | 9/2003 | Becquerelle et al. |
| 6,832,973 | B1 | 12/2004 | Welsh |
| 6,886,325 | B2 * | 5/2005 | Norris ....................... F02C 3/16 60/226.1 |
| 7,591,754 | B2 | 9/2009 | Duong et al. |
| 7,662,059 | B2 | 2/2010 | McCune |
| 7,694,505 | B2 | 4/2010 | Schilling |
| 7,704,178 | B2 | 4/2010 | Sheridan et al. |
| 8,047,505 | B2 | 11/2011 | Biester |
| 8,205,432 | B2 | 6/2012 | Sheridan |
| 8,231,503 | B2 * | 7/2012 | Buelna ................ B64C 29/0033 475/344 |
| 2005/0081668 | A1 | 4/2005 | Hagihara |
| 2005/0192151 | A1 | 9/2005 | Simon |
| 2008/0006018 | A1 | 1/2008 | Sheridan et al. |
| 2008/0044276 | A1 | 2/2008 | McCune et al. |
| 2008/0116009 | A1 | 5/2008 | Sheridan et al. |
| 2009/0090096 | A1 * | 4/2009 | Sheridan .................. F02C 7/36 60/226.3 |
| 2009/0227415 | A1 | 9/2009 | Buelna |
| 2009/0277299 | A1 | 11/2009 | Gmirya |
| 2009/0293278 | A1 | 12/2009 | Duong et al. |
| 2009/0298640 | A1 | 12/2009 | Duong et al. |
| 2011/0092331 | A1 | 4/2011 | Haughom |
| 2011/0206498 | A1 * | 8/2011 | McCooey ............... F02C 3/107 415/124.1 |

FOREIGN PATENT DOCUMENTS

| | | |
|---|---|---|
| FR | 1357038 | 4/1964 |
| GB | 111329 | 11/1917 |
| GB | 364719 A | 1/1932 |
| JP | 4636927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |
| WO | 2012010165 A2 | 1/2012 |

OTHER PUBLICATIONS

International Search Report and Written Opinion for International Application No. PCT/US2013/023356 completed on Oct. 22, 2013.
American Petroleum Institute. Special Purpose Gear Units for Petroleum, Chemical, and Gas Industry Services. API Standard 613 Fourth Edition. Jun. 1995. pp. 1-73.
Drago, Raymond J., Fundamentals of Gear Design, 1988, pp. 22-23.
Drago, Raymond J., "Helical Gears", Standard Handbook of Machine Design, Chapter 35, pp. 35.1-35.57.
Day, Percy C., "Herringbone Gears", Transactions American Society of Mechanical Engineers, 1912, pp. 681-715.
Townsend, Dennis P., "Gear Types and Nomenclature", Dudley's Gear Handbook, Second Edition, 1991, p. 2.7.
Gunston, Bill, "Jane's Aero-Engines," Issue Seven, 2000, pp. 510-512.
Helical Gears, Double Helical Gears; From DixiTech CNC, http://www.dixitechcnc.com/helical_gear.html.
International Preliminary Report on Patentability for PCT Application No. PCT/US2013/023356 mailed on Aug. 14, 2014.

* cited by examiner

TURBINE ENGINE GEARBOX

CROSS REFERENCE TO RELATED APPLICATIONS

This application is a continuation of U.S. patent application Pat. No. 14/174,878, filed Feb. 7, 2014, which is a continuation-in-part of U.S. patent application Ser. No. 13/438,245, filed on Apr. 3, 2012, which claims priority to U.S. Provisional Application No. 61/592,964, filed on Jan. 31, 2012.

BACKGROUND

This disclosure relates generally to a turbine engine, and more specifically to a gearbox for a gas turbine engine.

A turbine engines includes a fan driven by a turbine. A gearbox is coupled between the fan to the turbine. The gearbox provides a speed decrease between the turbine and the fan.

SUMMARY

In a featured embodiment, a gas turbine engine has a fan, a compressor and a combustor, and a fan drive turbine rotor to drive the fan through a gear reduction. The gear reduction includes at least two double helical gears in meshed engagement, each of the at least two double helical gears disposed to rotate about respective axes, and each of the at least two double helical gears having a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth.

In another embodiment according to the previous embodiment, the fan drive turbine drives a compressor rotor of the compressor, along with the fan through the gear reduction.

In another embodiment according to any of the previous embodiments, the gear reduction includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, a gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

In another embodiment according to any of the previous embodiments, the gearbox includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another featured embodiment, a method of designing a gas turbine engine includes providing a fan, a compressor and a combustor, and providing a fan drive turbine rotor to drive the fan through a gear reduction. The gear reduction includes at least two double helical gears in meshed engagement. Each of the at least two double helical gears are disposed to rotate about respective axes. Each of the at least two double helical gears have a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth.

In another embodiment according to the previous embodiment, the fan drive turbine drives a compressor rotor, along with the fan through the gear reduction.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gearbox includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, a gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

These and other features can be best understood from the following specification and drawings, the following of which is a brief description.

DETAILED DESCRIPTION

Figure 1:
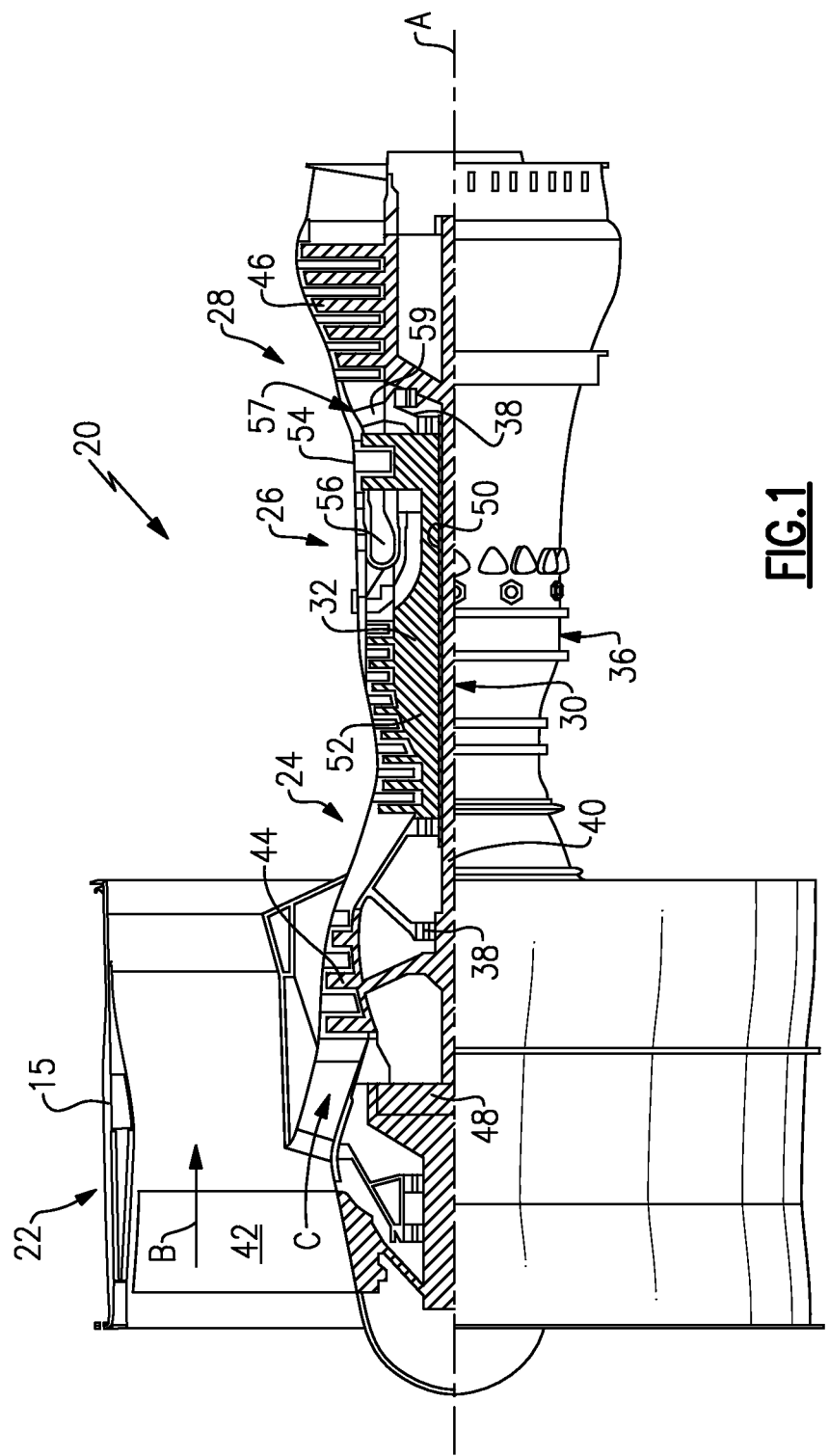
FIG. 1 is a cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a star system, a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

As can be appreciated, the low pressure turbine 46 is a fan drive turbine, as it drives the fan rotor 42. In the disclosed two-spool embodiment, the turbine 46 also drives a lower pressure compressor 44.

Figure 2:
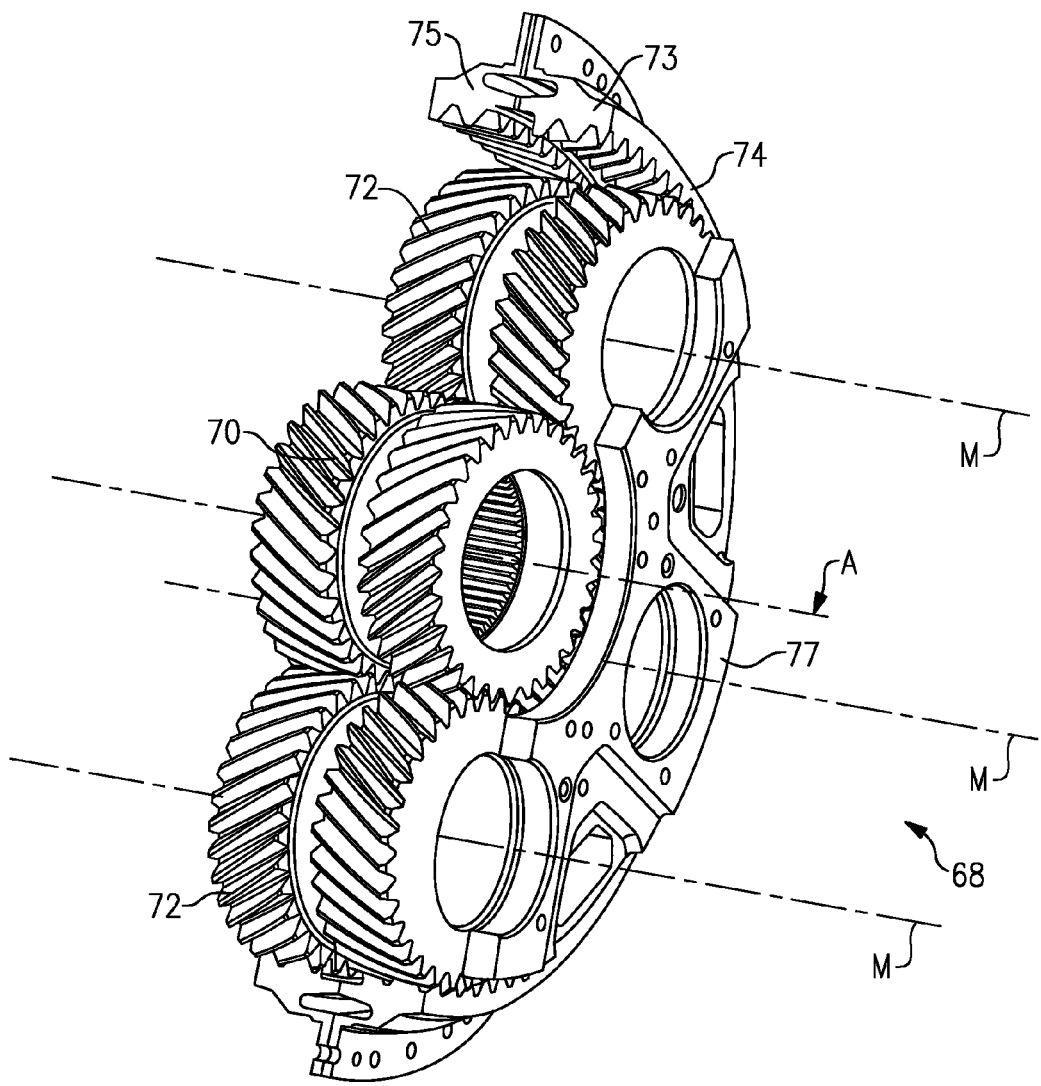
FIG. 2 is a perspective view of example gearbox.

FIG. 2 shows an example of the gearbox 48 as the epicyclical gear system 68 driven by the low speed spool 30. The epicyclical gear system 68 includes a sun gear 70, star gears 72, a ring gear 74, and a carrier 77. The sun gear 70 engages the star gears 72 and each star gear 72 engages the ring gear 74. In this example, each of the sun gear 70, star gears 72, and ring gear 74 are double helical gears, as will be described in further detail below.

Rotary motion of sun gear 70 urges each star gear 72 arranged about the sun gear 70 to rotate about their own respective axis M. The star gears 72 mesh with both the rotating ring gear 74 and rotating sun gear 70. The star gears 72 rotate about their respective axis M to drive the ring gear 74 to rotate about engine axis A. The rotation of the ring gear 74 drives the fan 42 (FIG. 1) at a lower speed than the low spool 30. The ring gear 74 is a split assembly and includes a first section 73 and a second section 75 that are urged together by the star gears 72.

In one example, the sun gear 70, star gears 72, and ring gear 74 have a transverse contact ratio greater than two (2) such that at least two gear teeth of each gear 70, 72, 74 engage at least two gear teeth of another gear 70, 72, 74 during operation.

The gearbox 48 is subject to variations in torque transfer due to geometry and manufacturing tolerances. These variations cause vibrations in the gearbox 48, which are imparted on other associated turbine engine components. The resultant vibration affects durability of gearbox 48 components, and associated turbine engine components, thus affecting the life of the gearbox 48 and gas turbine engine 20 components.

Figure 3:
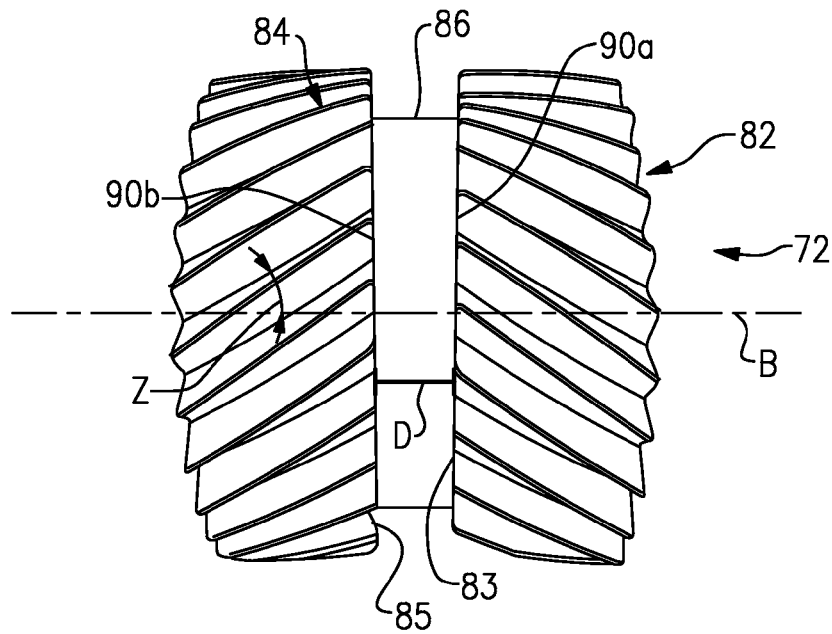
FIG. 3 is a perspective view of an example double helical gear.
Figure 4:
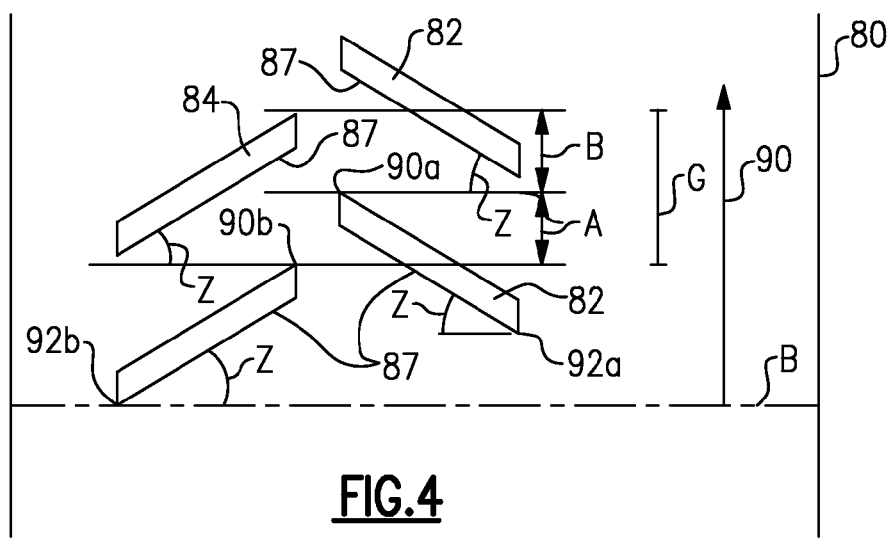
FIG. 4 is a top schematic view of teeth of the example double helical gear of FIG. 3.

FIGS. 3 and 4 shows an example of one of the star gears 72 as a double helical gear. It is to be understood that the described examples herein are also applicable to the sun gear 70, and ring gear 74, as well as other gears or gear systems of the gas turbine engine 20.

The star gear 72 includes a first plurality of gear teeth 82 disposed on a first base 83 opposite a second plurality of gear teeth 84 disposed on a second base 85 along axis B. The first plurality of gear teeth 82 and the second plurality of gear teeth 84 are separated by a non-toothed ring 86 disposed about axis B such that a first end 90a of the first plurality of gear teeth 82 and a first end 90b of the second plurality of gear teeth 84 are spaced apart an axial distance D equal to the width of the ring 86. The first plurality of gear teeth 82 and the second plurality of gear teeth 84 are rotatable around axis B.

In one example, the axial distance D of the width of non-toothed ring 86 is between 16% and 24% of the total axial length of the gear. In a further example, the first plurality of gear teeth 82 and the second plurality of gear teeth 84 each have an equal helix angle Z. In a further example, each of the first plurality of gear teeth 82 and the second plurality of gear teeth 84 have the same helix angle Z such that no axial thrust load is generated along axis B.

In another example, helix angle Z of the first plurality of gear teeth 82 is different than the helix angle Z of the second plurality of gear teeth 84, to generate a pre-determined thrust load along axis B in the gas turbine engine 20.

Each of the second plurality of gear teeth 84 includes the first end 90b and a second end 92b. Similarly, each of the first plurality of gear teeth includes the first end 90a and a second end 92a. In one example, the second plurality of gear teeth 84 is offset a circumferential offset distance A in relation to the next gear tooth 82 of the first plurality of gear teeth 82 when moving in circumferential direction of arrow 90. The first end 90a of each of the first plurality of gear teeth 82 is similarly spaced a circumferential offset distance B apart from the first end 90b of the next corresponding gear tooth 84 of the second plurality of gear teeth 84 when moving in direction of arrow 90. Circumferential offset distance G is a total of the circumferential offset distance A and the circumferential offset distance B between adjacent teeth of the second plurality of gear teeth 84 or first plurality of gear teeth 82.

Each of the first plurality of gear teeth 82 and second plurality of gear teeth 84 are arranged at the helix angle Z between axis B and a circumferential surface 87 each of the first plurality of gear teeth 82 and the second plurality of gear teeth 84. In this example, each of the first plurality of gear teeth 82 and the second plurality of gear teeth 84 are arranged at an equivalent helix angle Z relative to axis B.

In one example, the helix angle Z is between 30 and 35 degrees. In a further example, the helix angle Z is 33 degrees. The given helix angle Z or range urges the first section 73 and second section 75 of the ring gear 74 together.

The selected helix angle Z also influences the dynamics of the gearbox 48. As the helix angle Z increases from 0, a greater number of gear teeth 82, 84 engage teeth 82, 84 of a mating sun gear 70 and ring gear 74 (See FIG. 2). Selecting the first plurality of gear teeth 82 and second plurality of gear teeth 84 with the disclosed helix angle Z provides additional contact, and higher torque transfer, while maintaining the size of star gear 72.

Circumferential offset distance A and circumferential offset distance B are determined and used to offset each of the first plurality of gear teeth 82 from the next corresponding tooth 84 of the second plurality of gear teeth 84 between 0% and 100% of the circumferential offset distance G between each of the respective first plurality of gear teeth 82 or second plurality of gear teeth 84. In another example, the first plurality of gear teeth 82 are between about 25% to 75% offset from the second plurality of gear teeth 84 such that the ratio of circumferential offset distance A to circumferential offset distance G is between about 0.25 and 0.75. In a further example, the first plurality of gear teeth 82 are 50% offset from the second plurality of gear teeth 84, such that circumferential offset distance A and circumferential offset distance B are equal.

In another example, the circumferential offset distance A is selected in response to a gear characteristic of the star gear 72. The gear characteristic is at least one of harmonic level, transmission error, and vibration level through the star gear 72.

Figure 5A:
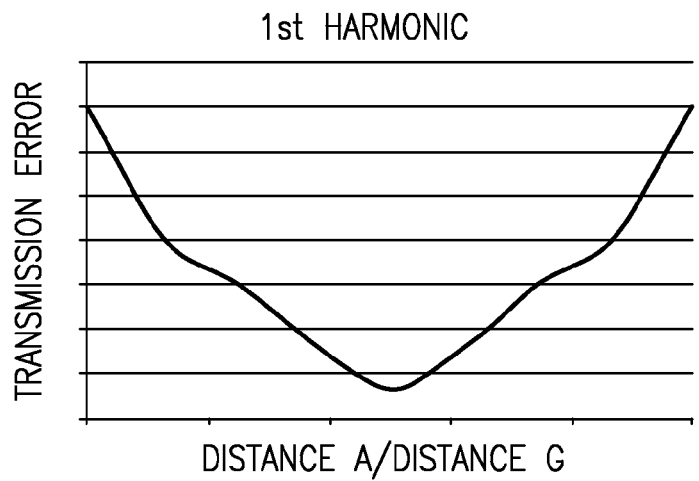
FIGS. 5A-5C are graphs illustrating example transmission error and gear teeth offsetting of the example double helical gear of FIG. 3.
Figure 5B:
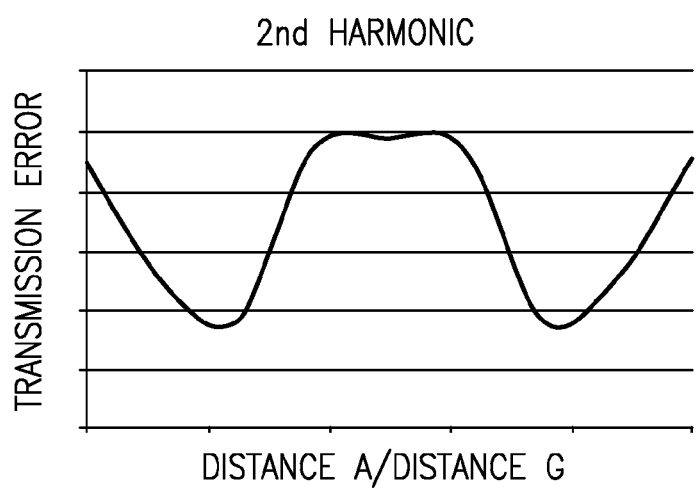
Figure 5C:
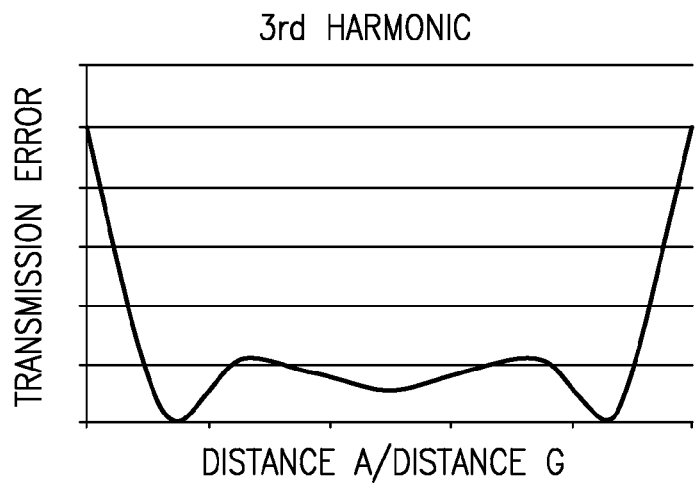

FIGS. 5A-5C show the circumferential offset distance A is pre-determined to provide a percent offset (axis X) in response to a frequency of the star gear 72 during meshing of star gears 72 in the gearbox 48. The percent offset results in a change in transmission error to effect the chosen frequency. Performance of the star gear 72 is controlled in response to the frequency based on the selected percent offset to reduce or minimize the amount of transmission error and vibration.

The frequency represents a harmonic level. In this example, a first harmonic has a frequency equal to the number of teeth on the sun gear times the revolutions per second of the sun gear relative to the carrier 77, a second harmonic has a frequency of 2 times the first harmonic, and a third harmonic has a frequency of 3 times the first harmonic. For each of the first harmonic, second harmonic, and third harmonic, transmission error is controlled by selecting a pre-determined percent offset between the first plurality of gear teeth 82 and second plurality of gear teeth 84, as equates to circumferential offset distance A and circumferential offset distance B. Transmission error is defined herein as the deviation between the circumferential position that the star gear 72 should have and the actual position during meshing.

In one example, as shown in FIG. 5A, the first plurality of gear teeth 82 are between about 25% to 75% offset from the second plurality of gear teeth 84 such that a ratio of circumferential offset distance A to circumferential offset distance G is between about 0.25 and 0.75 to reduce transmission error in the first harmonic.

In a further example, as shown in FIG. 5B, the first plurality of gear teeth 82 are between about 15% to 25% or 75% to 85% offset from the second plurality of gear teeth 84 such that a ratio of circumferential offset distance A to circumferential offset distance G is between about 0.15 and 0.25 or between about 0.75 and 0.85 to reduce transmission error in the second harmonic.

In a further example, as shown in FIG. 5C, the first plurality of gear teeth 82 are between about 15% to 85% offset from the second plurality of gear teeth 84 such that a ratio of circumferential offset distance A to circumferential offset distance G is between about 0.15 and 0.85 to reduce transmission error in the third harmonic.

In a further embodiment, the first plurality of gear teeth 82 are offset about 50% from the second plurality of gear teeth 84 such that a ratio of circumferential offset distance A to circumferential offset distance G is about 0.5 to reduce transmission error in the first harmonic and the third harmonic.

Offsetting the first plurality of gear teeth 82 and the second plurality of gear teeth 84 the circumferential offset distance A or circumferential offset distance B reduces the overall transmission error of the gearbox 48. Circumferential offset distance A and circumferential offset distance B are determined depending on the harmonic level(s) of the star gears 72 during meshing. Performance of the gearbox 48, which is controlled by reduction in transmission error, reduces vibration in the gearbox 48 and gas turbine engine 20 during operation. Thus, torque transfer is smoother, with less overall effect on engine component life and efficiency due to vibration.

Figure 6:
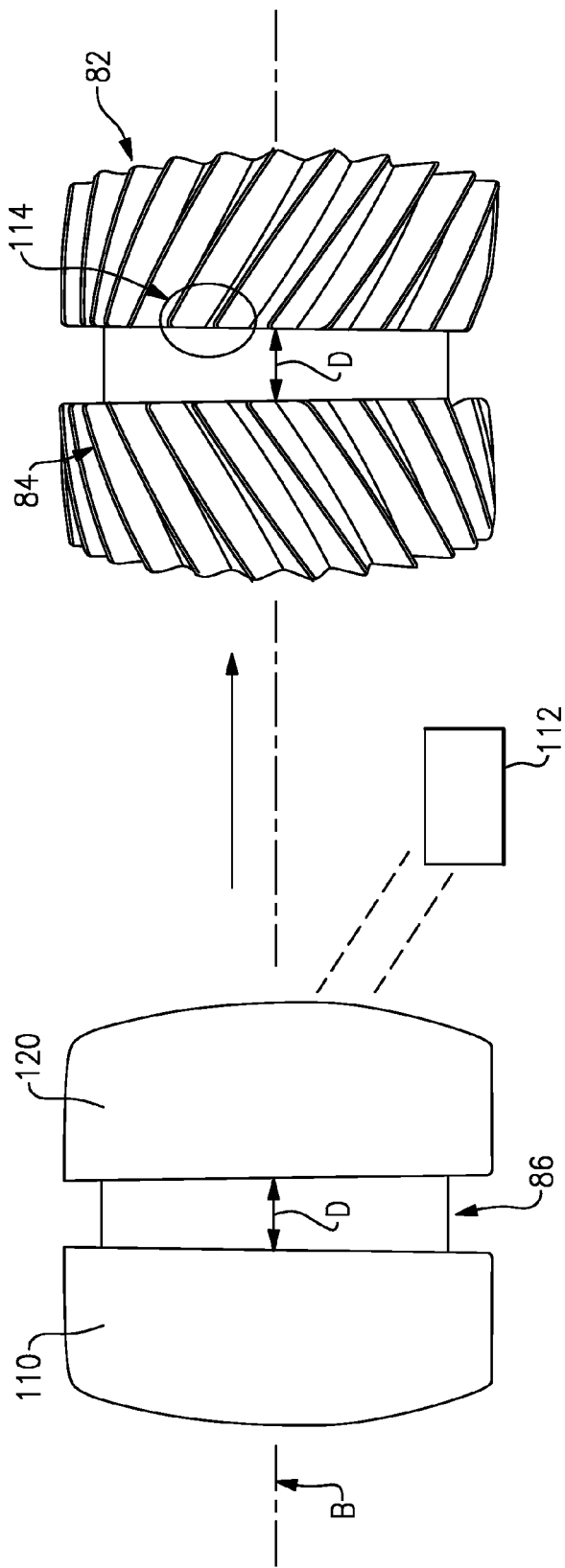
FIG. 6 is a perspective view of the steps of forming the example double helical gear of FIG. 3.

Referring to FIG. 6, an example method of forming the star gear 72 is shown. A first cylinder 110 and second cylinder 120 are arranged on either axial side of ring 86 along axis B. A tool 112 (shown schematically) is provided and machines grooves in the first cylinder 110 and the second cylinder 120 to form the first plurality of gear teeth 82 and second plurality of gear teeth 84. The first plurality of gear teeth 82 and second plurality of gear teeth 84 are arranged at an helix angle Z and offset an circumferential offset distance A and circumferential offset distance B, as described above. After one of the first plurality of gear teeth 82 and second plurality of gear teeth 84 are formed, the tool 112 is used to form the remaining plurality of gear teeth 82, 84 without affecting the dimensions of the already formed first plurality of gear teeth 82 or second plurality of gear teeth 84. The space between first cylinder 110 and second cylinder 120 provided by ring 86 allows the tool 112 to form the plurality of gear teeth 82, 84 without affecting the already formed plurality of gear teeth 82, 84. By offsetting the first plurality of gear teeth 82 and second plurality of gear teeth 84, the tool 112 is able to move into the space 114 between the already formed plurality of gear teeth 82, 84, thus reducing the width D of ring 86 needed to form the unformed plurality of gear teeth 82, 84. The reduction of width D decreases the weight of the star gear 72.

Although the example first cylinder 110 and second cylinder 120 are shown, it is within the contemplation of this disclosure to use other geometrical sections to form the star gear 72 based on gas turbine engine 20 specifications. In one example, the tool 112 is a grinding wheel.

Figure 7:
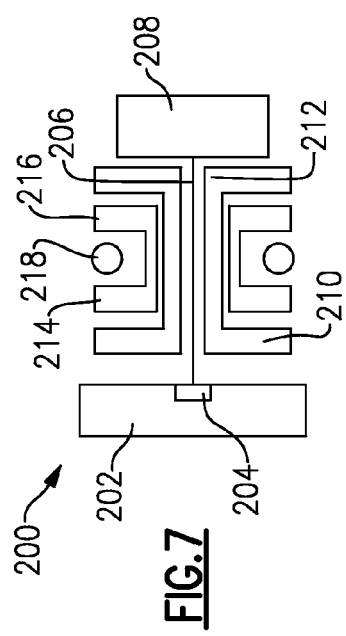
FIG. 7 shows an alternative embodiment.

FIG. 7 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine rotor 216.

Figure 8:
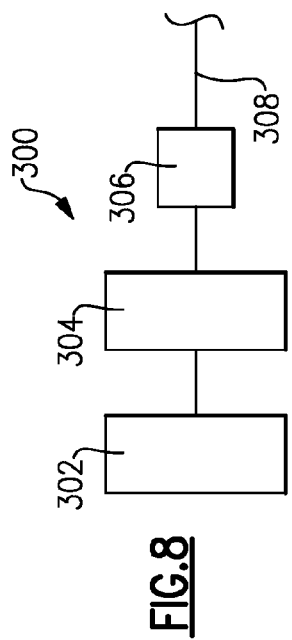
FIG. 8 shows another alternative embodiment.

FIG. 8 shows yet another embodiment 300 wherein a fan rotor 302 and a first stage compressor 304 rotate at a common speed. The gear reduction 306 (which may be structured, mounted and operated as disclosed above) is intermediate the compressor rotor 304 and a shaft 308 which is driven by a low pressure turbine section.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. A gas turbine engine comprising:
   a fan;
   a compressor and a combustor;
   a fan drive turbine rotor to drive the fan through a gear reduction; and
   the gear reduction including at least two double helical gears in meshed engagement, each of the at least two double helical gears disposed to rotate about respective axes, and each of the at least two double helical gears having a first plurality of gear teeth axially spaced from a second plurality of gear teeth by a spacer, wherein each of the first plurality of gear teeth has a first end facing the spacer and each of the second plurality of gear teeth has a first end facing the spacer, with each first end of the first plurality of gear teeth being circumferentially offset from each first end of the second plurality of gear teeth.

2. The gas turbine engine as set forth in claim 1, wherein the fan drive turbine for driving a compressor rotor of the compressor, along with the fan through the gear reduction.

3. The gas turbine engine as set forth in claim 1, wherein the gear reduction includes an epicyclic gear system.

4. The gas turbine engine as set forth in claim 3, wherein the gear reduction is an epicyclic gear system that includes a sun gear, a ring gear, and a plurality of intermediate gears that engage the sun gear and ring gear.

5. The gas turbine engine as set forth in claim 4, wherein said at least two helical gears are part of said plurality of intermediate gears.

6. The gas turbine engine as set forth in claim 1, wherein a gear ratio of the gear reduction being greater than or equal to about 2.5:1.

7. The gas turbine engine as set forth in claim 1, wherein there are two additional turbine rotors, with one of the two additional turbine rotors driving a low pressure compressor rotor, and a second of the additional turbine rotors driving a high pressure compressor rotor.

8. The gas turbine engine as set forth in claim 7, wherein the gear reduction includes an epicyclic gear system.

9. The gas turbine engine as set forth in claim 8, wherein the gear reduction is an epicyclic gear system that includes a sun gear, a ring gear, and a plurality of intermediate gears that engage the sun gear and ring gear.

10. The gas turbine engine as set forth in claim 9, wherein said at least two helical gears are part of said plurality of intermediate gears.

11. A method of designing a gas turbine engine comprising:
    providing a fan, a compressor and a combustor;
    providing a fan drive turbine rotor to drive the fan through a gear reduction; and
    the gear reduction including at least two double helical gears in meshed engagement, each of the at least two double helical gears disposed to rotate about respective axes, and each of the at least two double helical gears having a first plurality of gear teeth axially spaced from a second plurality of gear teeth by a spacer, wherein each of the first plurality of gear teeth has a first end facing the spacer and each of the second plurality of gear teeth has a first end facing the spacer, with each first end of the first plurality of gear teeth being circumferentially offset from each first end of the second plurality of gear teeth.

12. The method as set forth in claim 11, wherein the fan drive turbine for driving a compressor rotor, along with the fan through the gear reduction.

13. The method as set forth in claim 12, wherein the gear reduction is an epicyclic gear system that includes a sun gear, a ring gear, and a plurality of intermediate gears that engage the sun gear and ring gear.

14. The method as set forth in claim 13, wherein said at least two helical gears are part of said plurality of intermediate gears.

15. The method as set forth in claim 11, wherein the gearbox includes an epicyclic gear system.

16. The method as set forth in claim 15, wherein the gear reduction is an epicyclic gear system that includes a sun gear, a ring gear, and a plurality of intermediate gears that engage the sun gear and ring gear.

17. The method as set forth in claim 16, wherein said at least two helical gears are part of said plurality of intermediate gears.

18. The method as set forth in claim 17, wherein a gear ratio of the gear reduction being greater than or equal to about 2.5:1.

19. The method as set forth in claim 11, wherein there are two additional turbine rotors, with one of the two additional turbine rotors driving a low pressure compressor rotor, and a second of the additional turbine rotors driving a high pressure compressor rotor.

\* \* \* \* \*